United States Patent Office 3,354,194
Patented Nov. 21, 1967

---

3,354,194
META-PHENYLPHENOXY SUBSTITUTED SILOXANES AND PROCESS THEREFOR
Herbert C. Kaufman, New Haven, Conn., assignor to Olin Mathieson Chemical Corporation, a corporation of Virginia
No Drawing. Filed Jan. 30, 1964, Ser. No. 341,425
15 Claims. (Cl. 260—448.8)

ABSTRACT OF THE DISCLOSURE

Meta-phenoxy phenol is reacted with a dialkyl or diaryl dihalosilane or disiloxane to form an intermediate product which in the second stage of the reaction is reacted with a dihydroxy-substituted aromatic compound, such as resorcinol, to yield a high temperature resistant, silicon-containing fluid composition. If desired, the silane or siloxane can be first reacted with the dihydroxy-substituted aromatic compound and the resulting intermediate product can, in the final step, be reacted with meta-phenoxy phenol.

---

The invention relates to novel silicon-containing compositions which are prepared by reacting a dihalosilane or a dihalodisiloxane with meta-phenoxy phenol to form an intermediate product which is then reacted with a dihydroxy-substituted aromatic material to yield products having repeating disiloxanyl-meta-phenoxy linkages.

The silicon-containing compositions of this invention include compounds of the formula:

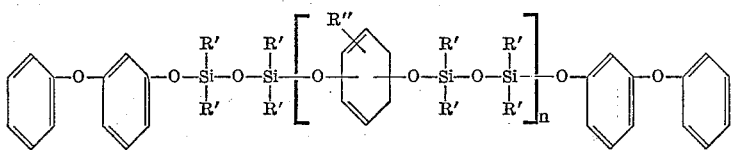

and of the formula:

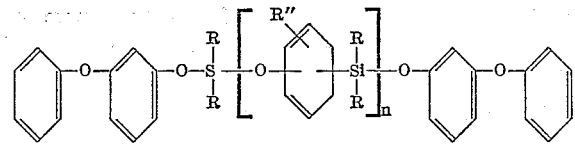

wherein R and R' are each selected from the group consisting of alkyl of from 1 to 5 carbon atoms and aryl of not more than 8 carbon atoms, R'' is selected from the group consisting of hydrogen, alkyl of from 1 to 5 carbon atoms, phenyl and alkaryl of not more than 8 carbon atoms, and $n$ is an integer of from 0 to about 10.

At the present time there are a number of materials which approach the high degree of oxidative, thermal and hydrolytic stability as well as the high degree of lubricity required for lubricants and hydraulic fluids used in high-speed aircraft. However, these compounds of the prior art do not exhibit good low-temperature characteristics and their viscosities decrease rapidly with temperature increases.

The product of the instant invention satisfactorily meets all requirements for such lubricants and hydraulic fluids. The combination of meta-linked phenyl ethers and siloxane or silane results in hydrolytically stable fluids exhibiting pour points down to —40° F. or below.

The two-stage reaction of this invention is conducted by first reacting meta-phenoxy phenol with the dihalosilane or dihalosiloxane, and then reacting thus-formed intermediate product with the dihydroxy-substituted aromatic compound or in the first step, the silane or siloxane material can be reacted with the dihydroxy-substituted aromatic compound and the resulting intermediate product can in the final step, be reacted with meta-phenoxy phenol.

Dihalosilanes of the formula:

wherein X is a halogen selected from the group consisting of chlorine, bromine or iodine and R is alkyl of from 1 to 5 carbon atoms or aryl of not more than 8 carbon atoms, are suitable starting materials in the process of this invention. Examples of such silanes include dimethyldichlorosilane, di-n-propyldichlorosilane, diamyldichlorosilane, diphenyldichlorosilane, etc. and the corresponding bromine and iodine derivatives.

Dihalosiloxanes suitable as starting materials in this novel process have the formula:

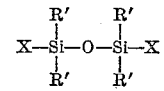

where R' is alkyl of from 1 to 5 carbon atoms or aryl of not more than 8 carbon atoms and X is chlorine, bromine or iodine. Typical examples of useful siloxanes include 1,3-dichlorotetramethylsiloxane, 1,3-dichlorotetraethylsiloxane, 1,3-dichlorotetraisoamylsiloxane, 1,3-dichlorotetraratolylsiloxane, etc. and the corresponding bromine and iodine derivatives.

Useful dihydroxy-substituted aromatic compounds include those of the formula:

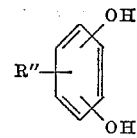

where R'' is hydrogen but may be alkyl of from 1 to 5 carbon atoms or aryl of not more than 8 carbon atoms and where the hydroxyl groups may be ortho, meta, or para to each other but where resorcinol is preferred. Resorcinol, hydroquinone, dihydroxytoluene, dihydroxybiphenol and catechol represent useful dihydroxy compounds.

Preferably the reaction is carried out in the presence of an inert solvent which can be, for example, decalin, dioxane, benzene, toluene and xylene. The temperature (overall) of the reaction can be varied from about 0° C. to about 300° C. depending upon the particular reaction conditions employed.

It has been found convenient to carry out the reaction of this process at reflux temperature although lower temperatures can be employed if desired. The amount of the silane compound employed can vary from about 1.5 to about 4.0 moles per mole of dihydroxy aromatic compound utilized and preferably will be not less than about 1.0 mole per mole of meta-phenoxy phenol employed. The time of the overall reaction will vary widely and generally will range from about 12 to about 96 hours or more. Although the process of this invention can be advantageously operated at atmospheric pressure, subatomospheric pressures as well as pressures up to about seven atmospheres or more can be utilized.

The products of this invention can be conveniently recovered from the reaction mixture by distillation or by other methods well known in the art.

The compounds of this invention are useful as lubricants, hydraulic fluids, heat transfer media, transformer oils, etc.

The following examples are illustrative and not limitative.

Example I

To a reaction flask equipped with a Dry Ice condenser there was charged 0.15 mole of 1,3-dichlorotetramethyl disiloxane in 100 g. of Decalin at ambient conditions. To the mixture was rapidly added 0.15 mole of meta-phenoxyphenol with stirring. The Dry Ice condenser prevented the escape of the volatile reactant with the evolving hydrogen chloride. The hydrogen chloride evolution began slowly. Heat was applied and hydrogen chloride was evolved vigorously at 60° C. for 3 hours. Next, the contents of the flask were stirred at 115° C. for 12 hours. After the hydrogen chloride evolution had ceased, the flask containing the yellow-colored solution was cooled to ambient temperature and 0.08 mole of solid resorcinol (insoluble in Decalin) was added and the slurry stirred as heat was applied. At 50° C. the evolution of hydrogen chloride began; at 80° C. hydrogen chloride was vigorously evolved and, after one hour, all the resorcinol had dissolved. The temperature of the mixture was raised to the reflux temperature of the Decalin, viz. 194° C., and maintained at that temperature for 12 hours.

The resulting amber-colored solution was cooled and distilled to remove the Decalin and unreacted phenols. Further distillation yielded products having the general formula shown below:

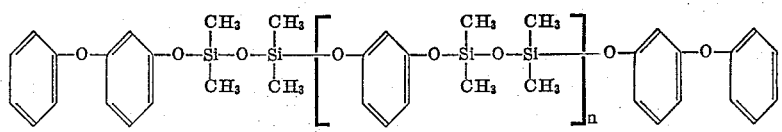

Product A: Sym-tetramethyl bis (meta-phenoxyphenoxy) disiloxane. Formula: See general formula above where $n=0$. Weight recovered: 25 g.—distilled as a colorless liquid at 225–8° C. (0.7 mm. Hg).

Analysis.—Calc'd. for $C_{28}H_{30}Si_2O_5$: Si, 11.16%. Found: Si, 11.1%.

Molecular Weight—Calc'd. for $C_{28}H_{30}Si_2O_5$: 502. Found: 485.

Product B: Sym-bis (tetramethyl, meta-phenoxy phenoxydisiloxanyl) meta-benzene. Formula: See general formula above where $n=1$. Weight recovered: 10 g.—distilled as a pale yellow liquid at 278–280° C. (0.07 mm. Hg).

Analysis.—Calc'd. for $C_{38}H_{46}Si_4O_8$: Si, 15.09%. Found: Si, 15.20%.

Molecular Weight—Calc'd. for $C_{38}H_{46}Si_4O_8$: 742. Found: 720.

Example II

To an apparatus similar to that of Example I there was charged 0.50 mole of resorcinol and 1.00 mole of water dissolved in 300 ml. of dioxane. The reaction flask was a 5-liter, glass, round-bottomed reactor equipped with a conventional heating mantle, a stirrer, and a condenser, cooled by circulating ice water and surmounted by a second condenser cooled by acetone and Dry Ice. The outlet of the final condenser was protected by a drying tube. A jacketed addition funnel, cooled by circulating ice water and protected from the atmosphere by a drying tube, was also connected to the reactor. A slow stream of nitrogen was introduced over the reactants. 2.00 moles of dimethyldichlorosilane were added to the reaction mixture with no visible sign of reaction. The temperature was raised to 36° and hydrogen chloride began to evolve slowly. When a temperature of 71° C. was reached, the dimethyldichlorosilane began to reflux and hydrogen chloride was copiously evolved. After 24 hours the temperature was raised to 103° C. and the reaction mixture was refluxed for another 24 hours. After the contents of the reactor had been cooled, 1.10 moles of meta-phenoxy phenol was added. As the temperature was raised to reflux at 103° C. hydrogen chloride began to be evolved. After 24 hours the evolution of hydrogen chloride had ceased and the contents of the flask were cooled and stripped of dioxane and unreacted phenols.

Further distillation yielded the following four products:

Product A—Weight 95 g.; distilled at 180° C./0.08 mm. Hg. By analysis this fraction was shown to be dimethyl bis (m-phenoxy phenoxy) silane.

Product B—Weight 120 g.; distilled at 223–6° C./0.08 mm. Hg. This product was sym-tetramethyl bis (meta-phenoxyphenoxy) disiloxane.

Product C—Weight 120 g.; distilled at 275–278° C./0.06 mm. Hg. This product was sym-bis (tetramethyl, meta-phenoxy-phenoxydisiloxanyl) meta-benzene.

Product D—Weight 30 g.; could not be distilled. Product D is an exemplification of a product of the formula:

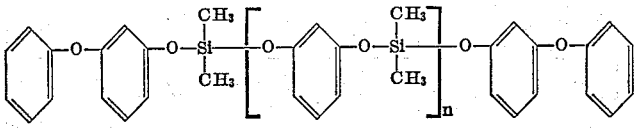

where $n$ is greater than 1.

Example III

The procedure and reactants of Example II were used in this example except that diphenyldichlorosilane was substituted for the dimethyldichlorosilane of Example II. The major product was sym-bis (meta-phenoxyphenoxy, diphenyl) meta-disiloxybenzene of the formula:

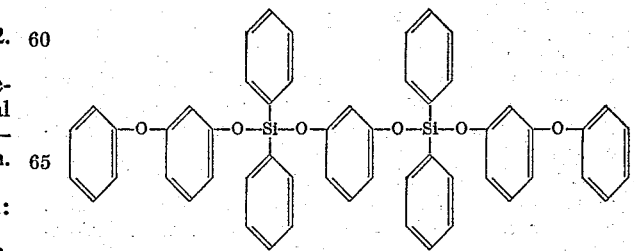

Product E a white crystalline monomer having a melting point of 107° C. and a boiling point of 315° C. (0.7 mm. Hg) which was recovered in 40 percent yield. The balance was a resinous polymer. The resinous polymer formed had the formula:

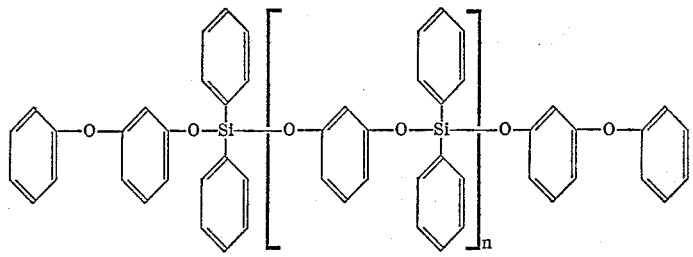

where $n$ is greater than 1.

Product E was analyzed for silicon, carbon and hydrogen and the following results were obtained:

*Analysis.*—Calc'd. for $C_{54}H_{42}Si_2O_6$: Si, 6.65; C, 77.02; H, 5.00. Found: Si 6.6, 6.6; C, 77.10, 76.98; H, 4.97, 4.95.

Example IV

In this example 1.0 mole of diphenyldichlorosilane was reacted with 0.5 mole of resorcinol in a mixture of dioxane and benzene and refluxed at 95° C. until hydrogen chloride evolution ceased. The solvents were stripped off under vacuum and 0.62 mole of meta-phenoxy phenol was added. The reaction mixture was brought to reflux at 295° C. and maintained at that temperature for 24 hours until the evolution of hydrogen chloride ceased. Excess phenols were stripped off and on continued distillation the product sym-bis (meta-phenoxyphenoxy, diphenyl) meta-disiloxybenzene (B.P. 315° C. at 0.7 mm. Hg) was recovered in 40 percent yield, the residue resinifying. The formula of the resinified residue was as follows:

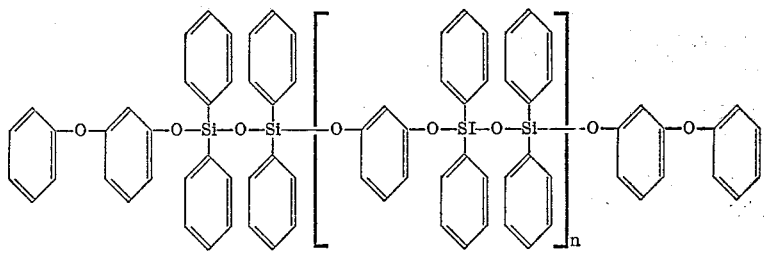

where $n$ is greater than 1.

Recrystallization of the product from cold isopropanol gave a white crystalline solid, M.P. 107° C.

Using the procedure of Military Specification H-8446 the hydrolytic stability of Product B of Example I was determined. Seventy-five grams of the product together with 25 g. of water and a bright copper strip specimen were placed in a glass bottle and rotated end-over-end at 200° F. for 48 hours. The copper strip specimen, which exhibited a weight loss of 0.22 mg./cm.$^2$, was bright and untarnished at the conclusion of the test. Before and after the test the acid number of the silicon-containing fluid (Product B) was zero. The acid number of the water layer was measured and found to be 3.89 mg. KOH/g. at the end of the test as compared to 3.45 mg. KOH/g. at the start. Thus the increase in acid number was 0.44 mg. KOH/g. while the maximum allowable for a hydraulic fluid is 5.0 mg. KOH/g. The viscosity of the silicon-containing fluid (at 100° F.) as measured before the test was 32.4 cs. while the viscosity (at 100° F.) at the conclusion of the test was 32.6 cs.

The flash point of Fraction B was found to be 480° F., the fire point 555° F. and the spontaneous ignition test value was 1100° F. The table below lists the results obtained in certain viscosity tests made with the three products of Example I.

VISCOSITY MEASUREMENTS

| Sample | −40° F. | 100° F. cs. | 210° F. cs. | 500° F. cs. |
|---|---|---|---|---|
| Product A | Pour point | 22.0 | 4.3 | 0.86 |
| Product B | do | 32.4 | 5.8 | 1.13 |
| Product C | do | 95.0 | 23.0 | 3.92 |

What is claimed is:

1. A method for preparing silicon-containing compounds which comprises: (A) reacting a material selected from the group consisting of a dihalosilane of the formula:

wherein X is a halogen selected from the group consisting of chlorine, bromine and iodine and R is selected from the group consisting of alkyl of from 1 to 5 carbon atoms, phenyl and alkaryl of not more than 8 carbon atoms, and a dihalodisiloxane of the formula:

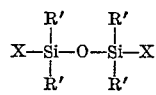

where X is a halogen selected from the group consisting of chlorine, bromine and iodine, and R' is selected from the group consisting of alkyl of from 1 to 5 carbon atoms, phenyl and alkaryl of not more than 8 carbon atoms, with a compound of the formula:

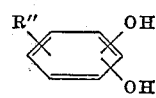

wherein R" is selected from the group consisting of hydrogen, alkyl of 1 to 5 inclusive carbon atoms, phenyl and alkaryl of not more than 8 carbon atoms to form an intermediate product, and (B) reacting said intermediate product with meta-phenoxy phenol, there being from about 1.5 to about 4.0 moles of the said material reacted with each mole of the said compound and there being not less than about 1.0 mole of the said material reacted per mole of meta-phenoxy phenol.

2. The method of claim 1 wherein the said material is a dihalosilane.

3. The method of claim 1 wherein the said material is a dihalodisiloxane.

4. The method of claim 1 wherein the said material is 1,3-dichlorotetramethyldisiloxane.

5. The method of claim 1 wherein the said material is dimethyldichlorosilane.

6. The method of claim 1 wherein the said material is diphenyldichlorosilane.

7. The method of claim 1 wherein the said compound is resorcinol.

8. The method of claim 1 wherein the reaction temperature is from about 0° C. to about 300° C.

9. The method of claim 1 wherein the reactions are carried out in the presence of an inert solvent.

10. The method of claim 1 wherein the said material is 1,3-dichlorotetramethyldisiloxane and the said compound is resorcinol.

11. The method of claim 1 wherein the said material is dimethyldichlorosilane and the said compound is resorcinol.

12. The method of claim 1 wherein the said material is diphenyldichlorosilane and the said compound is resorcinol.

13. A silicon-containing compound selected from the class consisting of compounds of the formula:

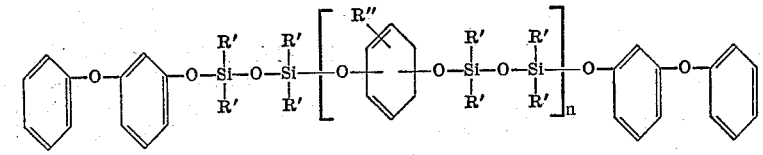

and of the formula:

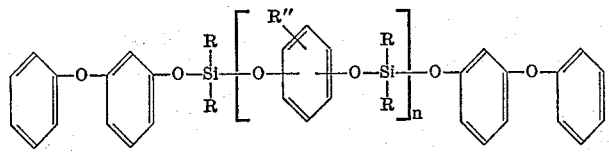

wherein R and R' are each selected from the group consisting of alkyl of from 1 to 5 carbon atoms, phenyl and alkaryl of not more than 8 carbon atoms, R" is selected from the group consisting of hydrogen, alkyl of from 1 to 5 carbon atoms, phenyl and alkaryl of not more than 8 carbon atoms, and $n$ is an integer from 1 to about 10.

14.

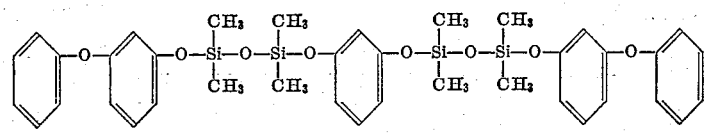

15.

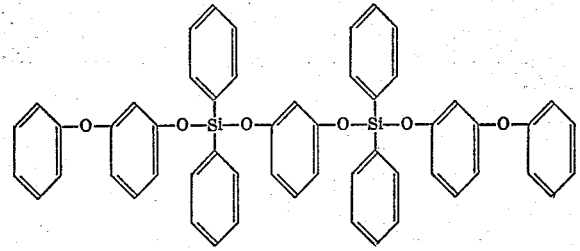

References Cited

UNITED STATES PATENTS 3,125,634    3/1964    Murray et al. ____ 260—448.8 X
3,125,635    3/1964    Murray et al. ____ 260—448.8 X
3,277,136   10/1966    Thiesse _____ 260—448.8

TOBIAS E. LEVOW, *Primary Examiner.*

HELEN M. McCARTHY, *Examiner.*

P. F. SHAVER, *Assistant Examiner.*

UNITED STATES PATENT OFFICE
CERTIFICATE OF CORRECTION

Patent No. 3,354,194                November 21, 1967

Herbert C. Kaufman

It is hereby certified that error appears in the above numbered patent requiring correction and that the said Letters Patent should read as corrected below.

Column 1, lines 31 to 40 and column 7, lines 51 to 60, for that portion of each formula reading

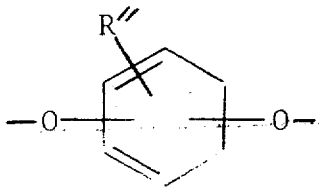     read     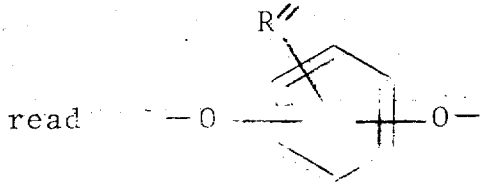

same column 1, lines 42 to 48, the formula should appear as shown below instead of as in the patent:

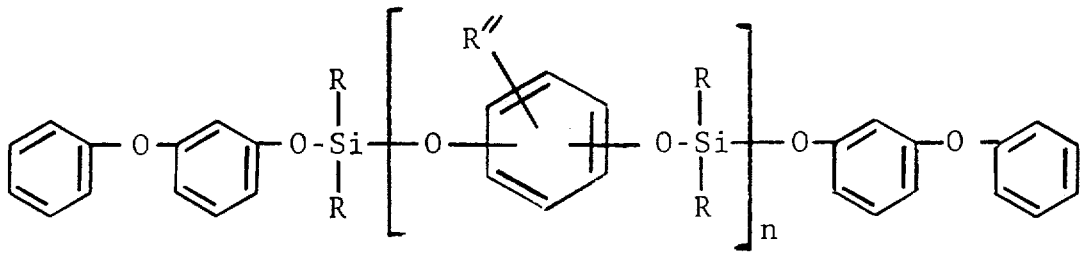

Signed and sealed this 11th day of February 1969.

(SEAL)
Attest:

EDWARD M. FLETCHER, JR.            EDWARD J. BRENNER
Attesting Officer                  Commissioner of Patents